Jan. 4, 1966  J. McLAUCHLAN  3,227,469
FENDER AND FENDER SHIELD ASSEMBLY
Filed Jan. 27, 1964  3 Sheets-Sheet 1
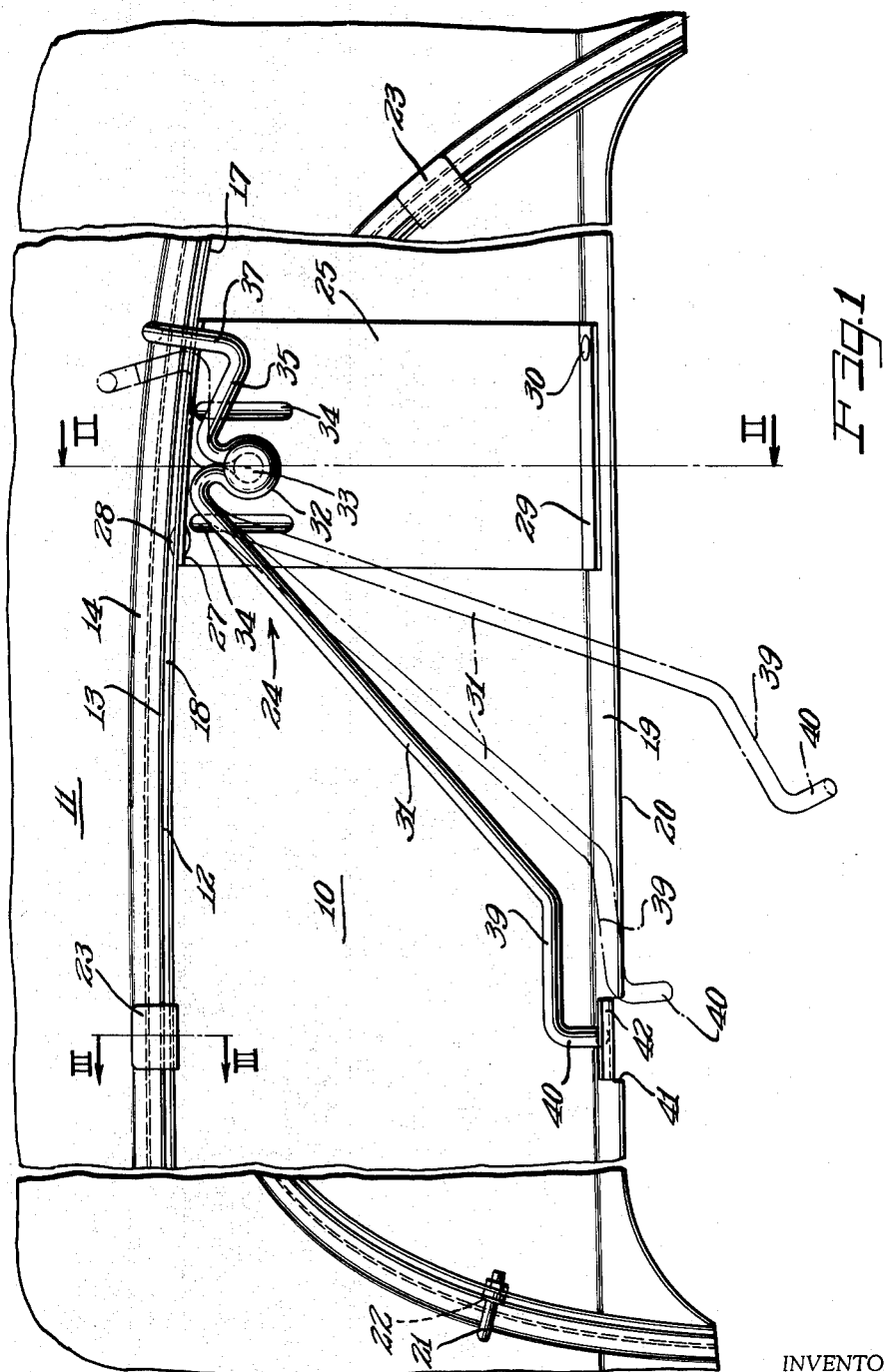
INVENTOR.
John McLauchlan
BY
ATTORNEYS

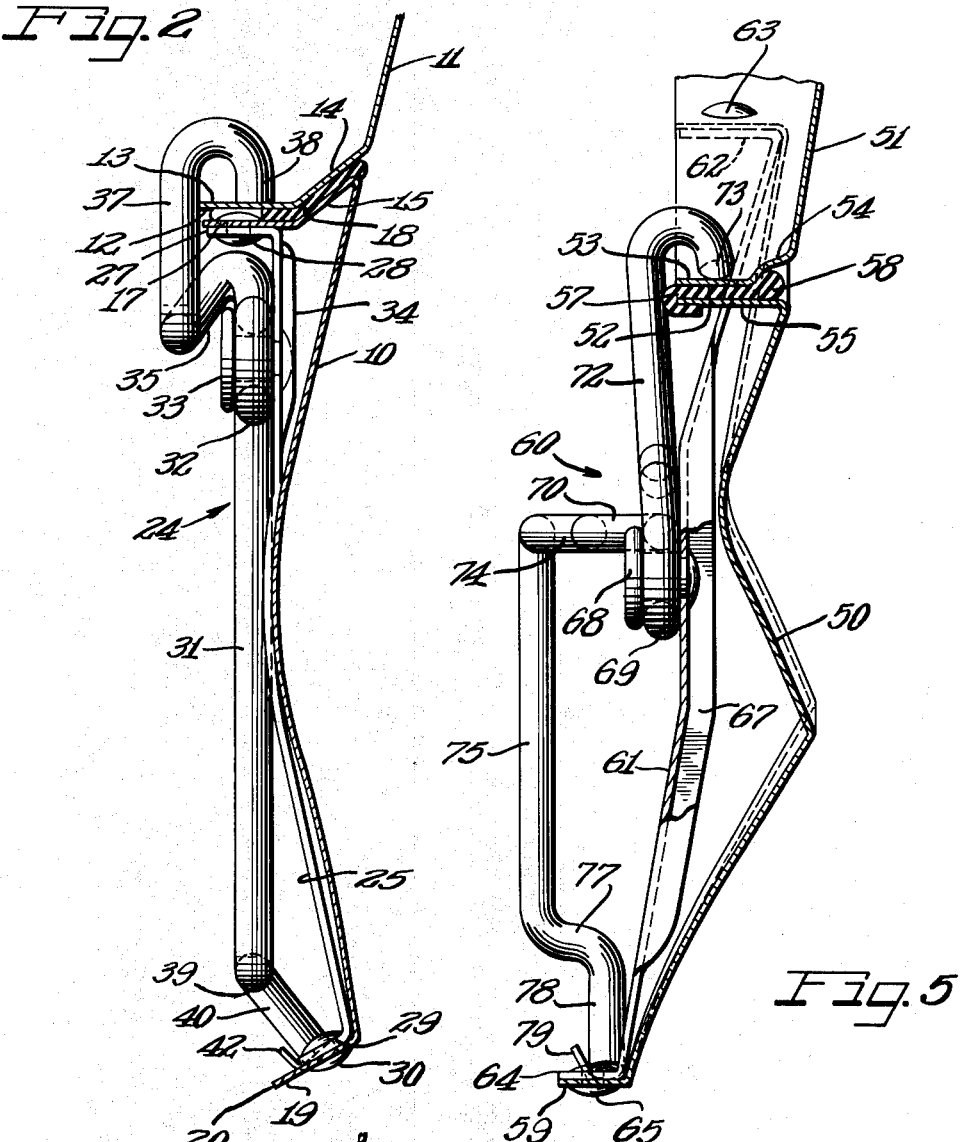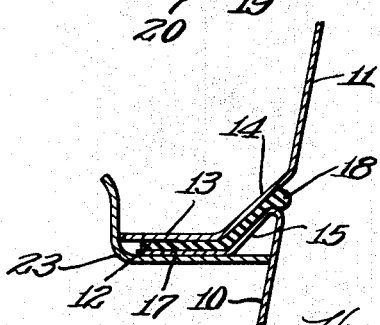

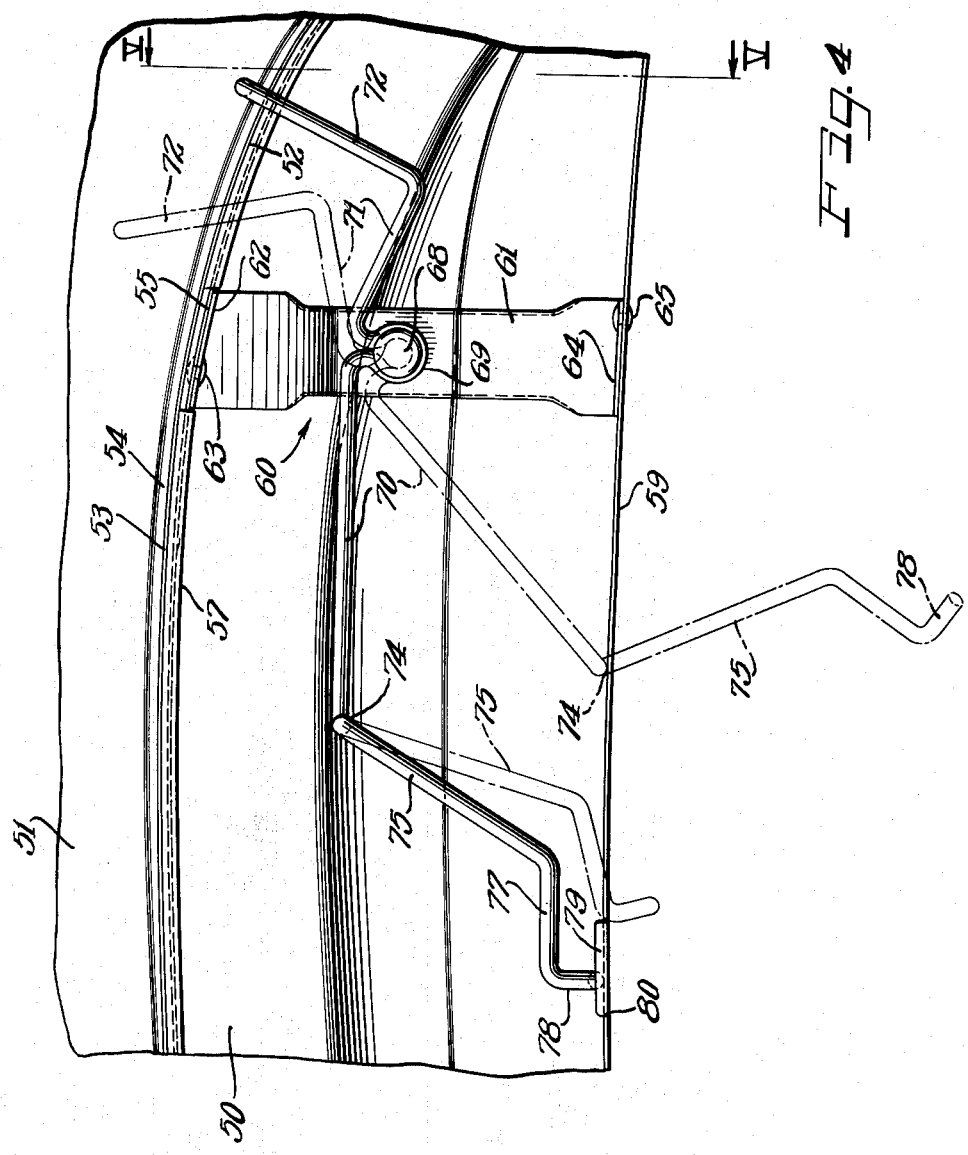

United States Patent Office 3,227,469
Patented Jan. 4, 1966

3,227,469
FENDER AND FENDER SHIELD ASSEMBLY
John McLauchlan, Royal Oak, Mich., assignor to Houdaille Industries, Inc., Buffalo, N.Y., a corporation of Michigan
Filed Jan. 27, 1964, Ser. No. 340,357
12 Claims. (Cl. 280—153)

This invention relates to improvements in fender and fender shield assemblies and more particularly relates to improved means for maintaining fender shields in place in the fender openings of automobiles.

By "fender shield" is meant a panel that is provided for the purpose of covering the opening in the fender or vehicle body provided for access to or removal of vehicle wheels. By the term "fender" is meant any form of wheel fender in its broad sense, whether such fender be separable from the vehicle body part, or an integral part of the vehicle body, and whether or not the fender projects outwardly from the principal body portion of the vehicle.

An important object of the present invention is to provide new and improved means for securing a fender shield to a fender.

Another object of the invention is to provide a simplified means for maintaining a fender shield not only in vertical position but also in horizontal position within a fender opening.

A further object of the invention is to provide a new and improved latch mechanism for fender shields.

Still another object of the invention is to provide a new and improved rotatable lock lever device for attaching fender shields in the openings of fenders.

Other objects, features and advantages of the present invention will be readily apparent from the following detailed description of certain preferred embodiments thereof taken in conjunction with the accompanying drawings in which:

FIGURE 1 is a fragmental inside elevational view of a fender and fender shield assembly embodying features of the invention;

FIGURE 2 is an enlarged fragmentary vertical sectional elevational detailed view taken substantially along the line II—II of FIGURE 1;

FIGURE 3 is a fragmentary vertical sectional view taken substantially along the line III—III of FIGURE 1;

FIGURE 4 is a fragmentary rear elevational view of a fender and fender shield assembly showing a modification; and FIGURE 5 is a vertical sectional elevational detail view taken substantially along the line V—V of FIGURE 4.

In one typical assembly embodying features of the present invention, as shown in FIGURES 1–3, a fender shield 10, also sometimes referred to as a fender panel or skirt, is assembled with a vehicle fender 11 in closing relation to a wheel access opening 12 in such fender. When thus mounted, the fender shield 10, in effect, provides a continuation of the outer face of the fender 11. Although other types of sheet material such as synthetic rigid or semi-rigid plastic may be used, currently the most economical material is sheet metal such as steel sheet or aluminum sheet from which the fender shield panel 10 may be fabricated by suitable die press stamping to afford the desired external shape and appearance for the covered portion of the fender opening.

As best seen in FIGURES 2 and 3, the edge portion of the fender 11 defining the wheel access opening 12 is provided with an in-turned flange 13 joining the fender panel on an angular, and in this instance oblique, downwardly and inwardly directed intermediate juncture portion 14.

Marginally, the fender skirt or shield panel 10 has a reinforcing flange structure including an in-turned upper marginal flange comprising an oblique intermediate juncture flange portion 15 complementary to the fender flange portion 14 and an in-turned angular terminal portion 17 generally complementary to the fender flange portion 13. In the assembly, that is the mounted relation of the fender shield 10 to the fender 11, a sealing gasket strip 18 carried by the fender shield affords a rattle-proof and substantially fluid-tight joint between the opposing faces of the flanges. Along its lower margin, the fender shield 10 has a generally downwardly and inwardly oblique flange 19 terminating in an edge 20.

In mounting the fender shield 10 into position in the wheel access opening 12, a locating pin 21 mounted on the fender shield flange portion 17 and projecting outwardly thereon engages through a suitable hole 22 provided to receive the same in the fender flange portion 13. By having the pin 21 and the hole 22 adjacent one end of the fender shield and wheel access opening, mounting of the fender shield can be effected by an upward and endwise movement to introduce the elongated pin 21 into the hole 22 and then rocking the fender shield into its fully assembled relationship with the fender. In the final increment of such rocking assembly movement, generally L-shaped clips or brackets 23 secured as by welding to the underside of the fender shield flange portion 17 engage the edge of the fender flange portion 13 and together with the opposed spaced fender flange portion 15 retain the fender shield against any inward or outward displacement relative to the fender.

For drawing the fender shield 10 upwardly into firm mounted disposition relative to the fender shield 11 and for holding the fender shield against downward displacement from the fender, an improved, simple, economical, and highly efficient latching mechanism 24 is provided. A mount for the latching mechanism comprises a suitable heavy gauge sheet metal vertical panel strut 25 having an upper inturned reinforcing and attachment head flange 27 secured as by means of a rivet 28 to the underside of the fender shield upper marginal flange portion 17. At its lower end the strut has an inturned reinforcing foot flange 29 secured as by means of a rivet 30 to the upper side of the lower reinforcing fender-shield flange and in this instance the intermediate flange portion 19. Mounting of the strut 25 is at a suitable location intermediate the length of the fender shield 10 and substantially spaced from its opposite ends. It will be observed that the strut 25 is located as close as practicable to the inner face of the panel of the fender shield 10 and outwardly from a plane across the edges of the flanges 17 and 20, in keeping with an aim in respect to this form of the invention to afford maximum clearance between the fender shield assembly and the associated wheel assembly of the vehicle.

Mounted on the strut 25 is a rod latch member comprising a substantially elongated resiliently flexible manipulating arm 31 and desirably made from a suitable guage of metallic rod or wire stock. In practical form this may comprise cold drawn steel wire of about .28 inch diameter, S.A.E. 1046 material having been found satisfactory. A distinct advantage of this material is that it can be economically shaped to afford a one-piece latch member which has excellent structural characteristics for this purpose and is possessed of desirable resiliency without undue flexibility.

Mounting of the latch member on the strut 25 is effected in such a manner that the latch member is substantially accommodated in a plane between a plane across the tips of the fender shield flanges and the inner face of the fender shield panel. Yet the latch member is adapted for ready manipulation and functions efficiently in affecting a releasable latched relationship of the fender shield to a fender. To this end, adjacent to one end of the latch arm 31 is formed a journal loop 32 engaged pivotally about a headed rivet 33 secured to the upper portion of the strut 25 and suitably adjacent to the head flange 17. Spaced vertical reinforcing ribs 34 are desirably pressed in the strut 25 adjacent opposite sides of the area in which the rivet 33 is mounted to stiffen the sheet metal strut and reduce any tendency toward undue flexing or buckling of the strut under latching stress.

Extending toward the opposite side of the loop from the arm 31 is a relatively short latching head extension portion 35 affording a short lever span in contrast to the long lever span of the arm 31. This latching head portion 35 extends in an endwise direction relative to the fender shield 10 and has projecting upward therefrom in horizontally offset or displaced relation to the journal loop 32, a hook finger 37 provided with an outwardly and downwardly turned latching terminal 38. As well observed in FIGURE 2, the latch head portion 35 is directed rearwardly relative to the plane of the arm 31 and the journal loop 32 sufficiently to clear the upstanding latching hook finger 37 past the tip of the fender flange 13 in the assembly, so that the latching terminal 38 can engage at its tip outwardly and downwardly against the upper face of the fender flange 13. It will be appreciated, of course, that if desired a reinforcing piece or plate may be mounted on the fender flange 13 to receive the latching terminal tip. Further, it will be observed that the latching head portion 35 is disposed at a suitable angle relative to the arm 31 and the finger 37, and the finger 37 is of suitable length such that in the latching position of the latch rod member the head 35 extends diagonally downwardly from its pivot loop end and towards its juncture with the finger 37 to a suitable extent to enable upward swinging clearance of the terminal hook 38 above the fender shield flange 17, as shown in the dot dash outline in FIGURE 1, to afford ample clearance for mounting and dismounting the fender shield 10. Further, the latch head portion 35 is engageable against the underside of the strut head flange 27 as a stop in the unlatched position.

In mounting the fender shield 10, after the pin 21 has been introduced into the opening 22 by an upward and inward movement of the fender shield 10, the fender shield is swung upwardly until the latching terminal 38 is cleared into position over the fender flange 13 whereupon the latching terminal 38 is hooked onto the fender flange and the under shield thus suspended while at least one hand of the person mounting the fender shield is freed for manipulation of the latch member. In this preliminary stage in mounting of the fender shield 10, the lower end portion of the latch arm 31 projects downwardly to an initial position below the lower margin of the fender shield substantially as shown in the lower dot dash outline in FIGURE 1.

Mounting of the fender shield 10 is completed while manipulating the latch arm 31 to swing the latch member about its pivot 33 to lower the latch terminal 38 relative to the fender shield and raise the fender shield swingably about the fulcrum provided by the mounting pin 21. For convenience in manipulating the latch arm 31 and for latch retaining purposes, it is provided with a laterally angular handle portion 39 preferably disposed in the same plane as the handle and the journal loop 32, and terminating in a downwardly and forwardly angular latching terminal 40.

As the latch member is swung into its latching position, the latch head 35 attains full latching position wherein the fender shield is drawn upwardly into firm interengagement of the opposing fender and fender shield flanges and the interposed gasket strip 18, while the latch arm 31 extends downwardly and diagonally in a direction away from the strut 25 as shown in the upper intermediate dash outline in FIG. 1 and with the latching terminal 40 still disposed position below the lower fender shield flange 19, 20. By virtue of its substantial length and resilient flexibility, the latch arm 31 is readily resiliently sprung upwardly until the latching terminal 40 clears through a gap 41 provided in the fender shield lower marginal flange and is cammed over a narrow upstanding and rearwardly angled retaining or keeper flange 42 turned up from the inner portion of the fender shield flange 19. As the tip of the terminal 40 clears the flange 42 it snaps into the fully latching position as shown in full lines in FIG. 1. In the finally latched position of the latch arm 31, the resilient tension therein assures complete and sustained firm retention of the fender shield in its mounted position and by, in effect, stiffening the latch rod member resists substantial flexings thereof during jolts in service as might cause rattling. Nevertheless, there is sufficient range of resilient flexibility of the elongated latch arm 31 to enable ready flexing and springing thereof into released position with respect to the retaining or keeper flange 42 and downward swinging of the latch arm to release the latch when it is desired to remove the fender shield 10.

In the preferred mounting of the latch mechanism 24, it is located nearer to the end of the fender shield remote from the mounting pin 21, and the latch head 35 is located adjacent to the side of the strut 25 which is remote from the mounting pin, while the latch arm 31 extends from the side of the strut 25 which is nearest to the mounting pin. This implements the rocking mounting of the fender shield and removal of the fender shield. Shear forces in the plane of the fender are effectively resisted by the interengagement of the mounting pin 21 with the fender flange 13.

Since fender designs vary and fender shield panel designs must conform to various preferred vehicle model design preferences, suitable variations in the arrangement of the latching mechanism of the fender shield may be required. One such variation or modification, as compared to the form of FIGURES 1–3, is shown in FIGURES 4 and 5 wherein a fender shield 50 is constructed and arranged for assembly with a fender 51 within a wheel access opening 52 defined by an inturned flange 53 on the fender having an intermediate juncture flange portion 54 defining an inset downwardly and outwardly opening groove. A marginal reinforcing inturned flange 55 on the fender shield opposes the fender flange 53 and carries attached thereto a sealing gasket strip 57 of rubber-like material having a substantial outer edge bead 58 which is adapted to engage within the groove in the angular intermediate fender flange 54 in maintaining the fender shield against inward displacement in association with suitable bracket clip and pin means (not shown) but which may be substantially similar to the pin and bracket means of FIGURE 1. Along its lower margin, the fender shield 50 has an inturned reinforcing flange 59.

A fender shield retaining latch mechanism 60, embodying the principles of the previously described latch mechanism 24, contains some variations dictated by design variations in the fender and fender shield. In this instance, a sheet metal strut 61 has a head flange 62 extending rearwardly and attached as by means of a rivet 63 to the under side of the fender flange 53 and a generally inwardly extending foot flange 64 secured as by means of a rivet 65 to the upper side of the lower fender reinforcing flange 59. Vertical side reinforcing flanges 67 on the strut stiffen it against buckling under latching stresses imposed through a headed bearing rivet 68 about which is pivotally engaged a journal loop 69 of a latch rod member including a resiliently flexible latch lever arm 70 of substantial length extending in one direction from the loop 69 and a substantially shorter latching lever head 71 extending in the opposite direction from the loop. In the assembly, the latch arm 70 extends beyond one side of the strut 61 while the substantially shorter latching head 71 extends beyond the opposite side of the strut.

Extending upwardly from the latching head portion 71 the latch member is a latching hook finger 72 disposed to clear the inner edges of the fender and fender shield flanges 53 and 55, respectively, and having a forwardly and downwardly extending latching hook terminal 73 engageable retainingly upon the upper side of the fender flange 53. In this instance, it will be observed that the pivot 68 is located substantially below the upper flange 55 of the fender shield and therefore the latch finger 72 is necessarily of substantial length proportionate to such disposition of the pivot and to enable swinging of the latch hook 73 to a desirable elevation in clearance relation above the fender flange 53, substantially as shown in dot dash outline in FIGURE 4, for mounting and removal of the fender shield.

In order to accommodate a substantially underslung disposition of the lower margin of the fender shield 50 as compared to the upper margin, the substantially elongated latch arm 70 is of an angular construction wherein that portion attached to the journal loop 69 extends to a substantial length generally horizontally in the latching position of the arm and has an offsetting bend juncture 74 with a downwardly oblique portion 75 disposed in a plane which will clear the lower fender shield flange 59. Hence, in the unlatched position of the latch arm, as shown in dot dash outline in FIGURE 4, the offsetting bend juncture 74 engages as a stop against the upper face of the fender flange 59. Extending generally angularly from the arm portion 75 is a manipulating handle portion 77 which extends outwardly sufficiently to enable retaining engagement of a downturned latching terminal 78 to engage upon the fender shield flange 59 between an upwardly and inwardly extending retaining or keeper flange 79 and the inner face of the fender shield panel. This keeper flange 79 is bent up from the lower marginal fender shield flange 59 and affords a strike-out notch 80 facilitating camming of the latch arm terminal 78 past the keeper flange 79 to snap into the latching position. As will be observed in FIGURE 4, in effecting the final latched condition of the latch arm, it is flexed generally as indicated from the intermediate dash line position into the full line fully latched position thereof, which places the latch member under effective resilient latching tension. Through this arrangement, mounting and removal of the fender shield 50 are effected substantially the same as described for the fender shield 10.

It will be apparent that many modifications and variations may be effected without departing from the scope of the novel concepts of the present invention.

I claim as my invention:

1. In a fender and a fender shield assembly including a fender having a wheel access opening defined by an inturned reinforcing flange and a fender shield panel having a reinforcing flange structure complementary to said fender flange and carrying a sealing gasket for clamped engagement between the flanges,
   means on the fender shield flange engageable with the fender flange for holding the fender shield against displacement from the plane of the fender,
   a supporting strut mounted on the inner side of the fender shield panel intermediate the length of and spaced substantially from the opposite ends of the fender shield panel,
   a resilient one-piece rod latch member having an intermediate journal loop with a latching head lever portion including a fender flange engaging hook terminal extending from one side of the loop and outwardly into overlying relation to said flanges and a substantially longer and resiliently flexible arm extending from the opposite side of the loop, said hook terminal being displaced horizontally from said intermediate journal loop,
   means on the strut providing a pivot bearing pivotally engaged by said journal loop and about which the latch member is pivotally movable by manipulation of said arm to swing said latching head lever portion between a non-latching position in which said hook terminal is spaced from said fender shield flange to clear said fender flange and a latching position in which said terminal engages retainingly upon the fender flange for effecting drawing of said fender and fender shield flanges into clamping engagement of said sealing gasket,
   and means on said latch arm and the fender shield panel for releasibly retaining the latch arm under resiliently flexed latching tension.

2. A fender and fender shield assembly as defined in claim 1, in which the fender has contiguous to its inturned reinforcing flange an angular oblique downwardly and inwardly directed intermediate juncture portion, and the fender shield panel has contiguous to its reinforcing flange structure an oblique intermediate juncture flange portion complementary to and opposing said intermediate juncture flange portion of the fender and thereby maintaining the fender shield against inward displacement, while said latching head lever portion acts in maintaining the fender shield against outward displacement relative to the fender.

3. A fender and fender shield assembly as defined in claim 1, in which said reinforcing flange portion of the fender and the reinforcing flange structure of the fender shield are substantially straight in a front-to-rear direction, a gasket being mounted on said fender shield flange and overlying the same and opposing the fender flange sealingly, said gasket having a raised bead on the outer edge thereof adjacent to juncture of the fender shield flange with the fender shield panel, and the fender has at juncture of the inturned reinforcing flange and the fender an intermediate juncture flange portion defining an inset downwardly and outwardly opening groove within which said bead is engaged and acts to maintain the fender shield against inward displacement, while said latching head lever portion acts in maintaining the fender shield against outward displacement relative to the fender.

4. A fender shield adapted to be assembled in a wheel access opening of a fender and including a panel having a supporting strut mounted on its inner side between and substantially spaced from its opposite ends,
   a one-piece resilient rod latch member having a journal loop and means pivotally mounting said loop on the upper portion of said supporting strut for swinging of the rod latch member in a plane substantially parallel with the fender shield panel,
   said latch member including a latching head projecting from one side of said loop and having an outwardly and downwardly turned latching terminal overlying the upper margin of the fender shield panel and a resiliently flexible latching arm extending generally downwardly and manipulatable for swinging the latching member about its pivot to move said latching terminal between a latching position relative to a flange on a fender and a non-latching position, said latching terminal being displaced horizontally from said journal loop.

5. A fender shield as defined in claim 4, wherein said latching head has shouldering engagement with the underside of said upper fender shield flange in the non-latching position of the latch member.

6. A fender shield including a generally horizontally elongated panel adapted to be mounted in a generally vertical position within the wheel access opening of a vehicle fender,
   means on the fender shield panel for retaining it against horizontal displacement from the associated fender including:
   a supporting strut mounted on the back of the fender shield panel substantially spaced from its opposite ends, and
   a one-piece resilient rod latch member and means pivotally mounting the latch member on an upper portion of the strut to swing in a plane generally parallel to the fender shield panel, said latch member having a manipulating arm of substantial length extending beyond one side of the strut and a substantially shorter latching head projecting toward the opposite side of the strut and having an angularly upwardly extending latch hook finger terminating in an outwardly and downwardly extending retaining terminal engageable upon a fender flange, said retaining terminal being displaced horizontally from the pivotal point of said latch member.

7. A fender shield including a generally horizontally elongated panel adapted to be mounted in a generally vertical position within the wheel access opening of a vehicle fender, means on the fender shield panel for retaining it against horizontal displacement from the associated fender including:

a supporting strut mounted on the back of the fender shield panel substantially spaced from its opposite ends, a resilient rod latch member and means pivotally mounting the latch member on the strut to swing in a plane generally parallel to the fender shield panel, said latch member having a manipulating arm of substantial length extending beyond one side of the strut terminating with a terminal lug and a substantially shorter latching head projecting toward the opposite side of the strut and having an angularly upwardly extending latch hook finger terminating in an outwardly and downwardly extending retaining terminal engageable upon a fender flange, said retaining terminal being displaced horizontally from the pivotal point of said latch member, and a lower marginal reinforcing flange on the fender shield panel having a limited portion thereof struck out and turned up to provide an upwardly extending keeper flange spaced from the back of the fender shield panel and engageable with said terminal lug for retaining the latch in latching position.

8. A fender shield as defined in claim 7, wherein said fender shield flange has a recess aligned with said keeper flange to facilitate receiving said terminal lug.

9. A fender shield as defined in claim 8, wherein said terminal lug is angled outwardly to facilitate engagement with said keeper flange.

10. A fender shield as defined in claim 7, wherein said terminal lug is offset outwardly so that although said arm can clear the fender shield flange, said terminal lug will engage with said keeper flange.

11. A fender shield having upper and lower inturned reinforcing flanges and a supporting strut secured between said flanges, a rod latch member having an intermediate journal loop with a latching head portion extending from one side of the loop and a manipulating arm extending from the opposite side of the loop, said head portion having a latching hook including an outwardly and downwardly turned terminal overlying the upper flange, said latching hook being displaced horizontally from said intermediate journal loop, said arm having an angular portion which extends downwardly for clearing the lower flange, said angular portion having a shoulder thereon engageable with said lower flange in the non-latching position of the latch member and having a retaining terminal engageable with the lower flange in the latching position of the latch member.

12. In a fender and a fender shield assembly including a fender having a wheel access opening defined by an inturned reinforcing flange and a fender shield panel having a reinforcing flange structure complementary to said fender flange and carrying a sealing gasket for clamped engagement between the flanges, a supporting strut mounted on the inner side of the fender shield panel intermediate the length of and spaced substantially from the opposite ends of the fender shield panel, means on the fender shield flange for holding the fender shield against displacement from the plane of the fender including respective clip brackets spaced from opposite sides of the strut and engagingly opposing the inner edge of the fender flange, a resilient 1-piece rod latch member having an intermediate journal loop with a latching head lever portion including a fender flange engaging hook terminal extending from one side of the loop and outwardly into overlying relation to said flanges and a substantially longer and resiliently flexible arm extending from the opposite side of the loop, a retaining member on one end of the fender shield panel engageable with the fender flange for resisting shear forces in the plane of the fender, means on the strut providing a pivot bearing pivotally engaged by said journal loop and about which the latch member is pivotally movable by manipulation of said arm to swing said latching head lever portion between a non-latching position in which said hook terminal is spaced from said fender shield flange to clear said fender flange and a latching position in which said terminal engages retainingly upon the fender flange for effecting drawing of said fender and fender shield flanges into clamping engagement of said sealing gasket, and means on said latch arm and the fender shield panel for releasably retaining the latch arm under resiliently flexed latching tension.

References Cited by the Examiner
UNITED STATES PATENTS

| | | | |
|---|---|---|---|
| 2,115,768 | 5/1938 | Haltenberger | 280—153 X |
| 2,606,773 | 8/1952 | Schatzman | 280—153 |
| 2,608,427 | 8/1952 | Schatzman | 280—153 X |
| 2,611,628 | 9/1952 | Schatzman | 280—153 |
| 2,613,092 | 10/1952 | Schatzman | 280—153 X |
| 2,761,698 | 9/1956 | Schatzman | 280—153 |

BENJAMIN HERSH, *Primary Examiner.*

LEO FRIAGLIA, *Examiner.*